United States Patent
Williams et al.

(10) Patent No.: US 6,757,781 B2
(45) Date of Patent: *Jun. 29, 2004

(54) BUFFER MANAGEMENT SYSTEM FOR MANAGING THE TRANSFER OF DATA INTO AND OUT OF A BUFFER IN A DISC DRIVE

(75) Inventors: Steven Scott Williams, Longmont, CO (US); Brett Alan Cook, Westminster, CO (US); Gregory Paul Moller, Longmont, CO (US); Jonathan Williams Haines, Lafayette, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/014,057

(22) Filed: Dec. 7, 2001

(65) Prior Publication Data

US 2003/0149815 A1 Aug. 7, 2003

Related U.S. Application Data

(63) Continuation of application No. 09/696,861, filed on Oct. 26, 2000, now Pat. No. 6,330,640
(60) Provisional application No. 60/171,779, filed on Dec. 22, 1999.

(51) Int. Cl.$^7$ ............................................. G06F 13/00
(52) U.S. Cl. ........................... 711/112; 710/52; 710/56
(58) Field of Search ............................ 711/112; 710/52, 710/56

(56) References Cited

U.S. PATENT DOCUMENTS

| | | | | |
|---|---|---|---|---|
| 4,412,285 A | | 10/1983 | Neches et al. ............... | 709/252 |
| 4,428,064 A | * | 1/1984 | Hempy et al. ............... | 711/113 |
| H513 H | | 8/1988 | Dunne et al. ................... | 708/4 |
| 4,910,667 A | | 3/1990 | Tanaka et al. ............... | 711/168 |
| 5,034,914 A | | 7/1991 | Osterlund ..................... | 710/52 |
| 5,179,530 A | | 1/1993 | Genusov et al. ............. | 708/520 |
| 5,276,662 A | | 1/1994 | Shaver, Jr. et al. ........... | 369/32 |
| 5,481,296 A | * | 1/1996 | Cragun et al. ............... | 725/136 |
| 5,594,926 A | | 1/1997 | Chang et al. ................. | 710/52 |
| 5,636,188 A | | 6/1997 | Funahashi ..................... | 369/32 |
| 5,689,653 A | | 11/1997 | Karp et al. .................... | 712/22 |
| 5,721,543 A | | 2/1998 | Johnson et al. ............... | 341/50 |
| 5,765,193 A | | 6/1998 | Rosich et al. ................ | 711/136 |
| 6,378,051 B1 | | 4/2002 | Henson et al. ............... | 711/151 |

FOREIGN PATENT DOCUMENTS

| EP | 0 473 314 A | 3/1992 |
|---|---|---|
| EP | 0 528 273 A | 2/1993 |

* cited by examiner

*Primary Examiner*—Reginald G. Bragdon
(74) *Attorney, Agent, or Firm*—David K. Lucente; Derek J. Berger

(57) ABSTRACT

A method and system for managing the transfer of data into and out of a buffer in a disc drive is disclosed. The operation of the vectored buffer management (VBM) system is administered by a software-based control module. The control module creates and maintains a buffer table by dividing the buffer table into buffer sectors. The buffer sectors are further arranged into buffer segments, or circularly linked lists upon which the buffer table is partitioned. The control module effectuates the transfer by implementing an application module across the buffer table. Once the application module is arbitrarily positioned at an index sector by the control module, data transfer is accomplished when the application module walks through a particular buffer segment identified by the index sector. Specific control of the application module across a buffer segment is administered through host and disc address pointers, which are coupled to host and disc next pointers, respectively.

13 Claims, 12 Drawing Sheets

BUFFER MANAGEMENT SYSTEM FOR MANAGING THE TRANSFER OF DATA INTO AND OUT OF A BUFFER IN A DISC DRIVE

RELATED APPLICATIONS

This application is a continuation of U.S. patent application Ser. No. 09/696,861, file date Oct. 26, 2000 which issued on Dec. 11, 2001 as U.S. Pat. No. 6,330,640, which claims priority of U.S. provisional application Serial No. 60/171,779, filed Dec. 22, 1999.

FIELD OF THE INVENTION

This application relates generally to disc drive caching techniques and more particularly to a buffer management system for controlling the transfer of data between a host computer and a disc of a disc drive.

BACKGROUND OF THE INVENTION

In a disc drive, data is stored on one or more discs coated with a magnetizable medium. Data is written to the discs by an array of transducers, typically referred to as read/write heads, mounted to a radial actuator for movement of the heads relative to the discs. The information is stored on a plurality of concentric circular tracks on the discs until such time that the data is read from the discs by the read/write heads. Each of the concentric tracks is generally divided into a plurality of separately addressable data sectors. The heads are used to transfer data between a desired track and an external environment, which includes, among many components, a host computer. During a read operation the head senses the data previously written on the disc track and transfers the information to the external environment. During a write operation, data is written onto the disc track. Once the data is written to the disc, each sector holds a block of data, which is the absolute smallest quantity that can be written to the disc during a single write operation. Adjacent blocks, commonly referred to as chunks, or clusters, are typically written to the disc during a single write operation referred to as a command. Critical to both of these operations—reading and writing—is the accurate locating of the head over the center of the desired track.

Typically, the heads are positioned with respect to the disc surfaces by an actuator voice coil motor. The voice coil motor is responsible for pivoting the actuator body about a pivot shaft, thus moving the heads across the disc surfaces. The actuator thus allows the heads to move back and forth in an accurate fashion between an inner radius and an outer radius of a disc. The actuator arm is driven by a control signal fed to the voice coil motor at the rear end of the actuator arm. A servo control system is used to sense the position of the actuator and control the movement of the head above the disc using servo signals read from a disc surface in the disc drive. The servo control system relies on servo information stored on the disc. The signals from this information generally indicate the present position of the head with respect to the disc, i.e., the current track position. The servo control system uses the sensed information to maintain head position or determine how to optimally move the head to a new position centered above a desired track. The servo control system then delivers a control signal to the voice control motor to position the head over a desired new track or to maintain the position over the desired current track.

The transfer of files between the host computer and the disc is controlled in a multi-level setting characterized by a bi-level transfer scheme. At a macroscopic level, track sectors are selected to contain the data sectors of which the file is divided. More specifically, and in a microscopic sense, cells along a track are magnetized to correspond to the bit structure of the file for the purposes of subsequent reading. A disc drive typically includes a buffer to implement this bi-level transfer scheme. The purpose of the buffer is to accept the sectors of data during its transfer between the host computer and the disc and then transfer the data to the proper component—either the host computer or the disc.

Typically, the system microprocessor contains programming designed to locate the sectors on the track where the data is to be read from or written to. The microprocessor is also programmed to control the transfer of the file at the sector, or macroscopic, level. The transfer of data to and from the buffer is accomplished in character-by-character fashion. The conventional method of accomplishing a transfer in a character-by-character environment is through the use of state machines, such as a buffer controller, a host interface controller, and a disc interface controller.

As described in U.S. Pat. No. 5,276,662, the transfer of files between the host and the discs is carried out under the overall control of the system microprocessor and a more precise control of the state machine controllers. For example, when a file is to be written to a disc, the host computer prompts the system microprocessor with generalized information which allows the microprocessor to define the sectors on the track to which the file is to be written. The microprocessor then initiates the transfer by implementing operations which result in transfer at the sector level. Such operations include commanding the servo control system to position the head over the selected track which is to receive the file and identifying a segment of the buffer which is to be used in the transfer. The microprocessor commands the host interface controller to initiate the transfer of the data to the buffer segment. Conventionally, the host interface controller, working in conjunction with the buffer controller and the host computer, provides precise control over the buffer in the transfer of characters of the file into sector blocks of the buffer segment. The disc interface controller controls the transfer of the blocks of data from the buffer segment to the appropriate sectors on a disc pursuant to commands issued by the system microprocessor once the read/write heads are positioned over the track that is to receive the file. A read/write circuit connected to the read/write heads then magnetizes the cells along the data tracks.

Conventionally, counters and interrupts are used in conjunction with the buffers to "watch over" the transfer of data to the buffer. The counters, which are typically located within the host and disc interface controllers, count the number of transfers that occur between both the host and the buffer and the disc and the buffer. Based upon this calculation, an interrupt generator supplies an interrupt to the microprocessor immediately after a selected number of transfers to the buffer have occurred. The use of counters and interrupts is to inquire as to whether the buffer is full when a transfer is to take place.

The most significant drawback of disc drives is a relatively long delay between the time that a read or write operation is initiated and the time that it is mechanically completed. This delay includes a seek latency, the time during which the read/write heads are moved to a desired track, a rotational latency, the time during which the disc rotates until a desired track sector is under the read/write head, and an additional delay corresponding to the time during which data blocks are read from or written onto the disc surface. Due to the aforementioned delays, the speed with which a disc drive operates is typically slower than that of the other components of the computer system. That being the case, it is advantageous, for total system performance, for the host system to transfer the data it wishes to write to a buffer, then allow the drive to commit that data to a disc at a later time that is optimal for the drive to perform the (mechanical) task of putting the data on the media. This concept, usually called write caching, is common to data storage devices.

A well-known means for reducing the number of disc accesses associated with almost any software application involves the use of a single common cache memory. The cache memory, typically a volatile random access memory (VRAM) device, stores blocks of data that are read from, or blocks that are to be written onto, the disc. Once the system issues a disc read operation the cache is first checked to see if the requested data block is already available, thus avoiding the typical physical disc read. If the data block is not available, then the system instructs the read/write heads to perform a disc read, from which the data is transferred to the cache.

As described in U.S. Pat. No. 5,765,193, it is common for requests of data from a disc to be specific as to related data, such as data files. The data files will be written to and stored on the disc in adjacent sectors of the track. Accordingly, a principle of reference is commonly known among computer programmers illustrating "when data is stored or to be stored at one location, it is highly probable that data stored or to be stored at physically adjacent locations will be accessed either simultaneously or soon thereafter each other." To realize this principle, data, which is to be written to a disc, is commonly transferred to a write cache prior to recording on the disc. This procedure is advantageous in two respects. First, it allows the host to quickly access the data without having to perform an actual read operation on the disc. In order to read directly from the write cache, the system must keep track of which data blocks are being held in the cache instead of the disc. Second, it gives the read/write heads time to catch up with the other components of the computer.

Once the cache is filled, the system microprocessor initiates write operations to transfer the data blocks in the cache to the disc drive. As further described in U.S. Pat. No. 5,765,193, there are several methods for managing the "orderly" transfer of data from the write cache to the disc. One common technique for managing the write cache is to supplement the disc write operation with instructions to search the write cache for adjacent data blocks. The existence of at least two adjacent data blocks defines a cluster, which the system will transfer in whole pursuant to the disc write operation. By reducing the number of disc accesses, this technique decreases the overall number of time-consuming seek operations. A second known technique involves keeping a "least recently used" (LRU) queue, which comprises a list of data blocks in its order of use. This technique uses a virtual block number, a number assigned to the data block in relation to its intended storage location on the disc, to rank the data blocks in relation to the order of most recent use by the system. Based on a theory that data blocks more recently used are more likely to be used again prior to less recently used data blocks, the system transfers the latter to the disc while retaining the former in the write cache for quick access by the central processing unit. A third, and more outdated, technique is to simply remove blocks from the cache on a first-in-first-out basis.

While all three techniques relating to the transfer of data from the buffer to the disc provide an effective means of implementing the storage and retrieval of data files, problems have arisen in conjunction with data transfer to a disc from buffers of limited data space. Particularly, if the data from the buffer is not transferred to the disc in first-in-first-out fashion, then the buffer sectors from which the data was transferred cannot be reused until the buffer sectors lower in order from the emptied sectors were, in fact, emptied. For example, in a 100-sector buffer, if sectors 45 through 50 were written to the disc, then that particular buffer space cannot be re-used by the host until buffer sectors 1 through 44 have been emptied. When dealing with disc drives of limited amounts of buffer data space, this "sequential" buffer accessing method is a significant disadvantage to the host computer with respect to write caching.

SUMMARY OF THE INVENTION

Against this backdrop the present invention has been developed. The present invention is a means for rearranging buffer sectors so that buffer data space can be used more efficiently. In particular, the vectored buffer management system, in accordance with the present invention, hereinafter called "VBM," provides a means for rearranging the buffer space so that transfer of data into and out of the buffer can be done in an arbitrary or random fashion. In essence, VBM allows data to be written to and from the buffer sectors in a non-sequential fashion. VBM contains three components: an algorithmic component, a hardware component, and a software component.

The algorithmetic component defines a model, referred to as the VBM table, of the data buffer as a logically organized singly linked list of sectors. Each entry in the VBM table represents a single sector of the buffer. Each sector of the buffer stores a data block having a logical block address (LBA) representing a sector on a disc in the disc drive. The buffer sector where the hardware component is currently positioned is referred to as the index sector. The value of each index sector is "next" sector, a physical buffer sector number denoting the "next" sector for the hardware component to reference upon conclusion of the transfer of data to or from the current index sector.

The hardware component is responsible for the physical transfer of data into and out of the buffer. During a disk write operation, the hardware component uses the "VBM" table as the basis for the management of the data transfer. This is accomplished by setting a host address pointer (HAP), which is responsible for committing the data to the buffer, and the disc address pointer (DAP), which is responsible for transferring the data from the buffer to the disc. The initial value of these pointers is arbitrarily selected by the software component. The HAP and the DAP both are coupled to a host next pointer (HNP) and a disc next pointer (DNP), respectively. The functions of the next pointers are to read the next sector value from the index sector in order to direct the address pointers to the next sector. The hardware also provides an automated traversal function independent of the task that is managing the buffer allocation such that the function can still traverse a large number of table entries, even when the CPU is performing another task.

The software component maximizes the advantage of write caching by ensuring that the maximum possible number of buffer sectors are available to new host write commands at any given time, and by minimizing the number of disk operations needed to complete the requests from the host. More particularly, the software provides the mechanism for creating and maintaining the VBM table that is used by hardware to direct data transfers into and out of the data buffer. The software component is further responsible for administering control of the hardware component. By creating a list of free buffer sectors, the software component also provides for the ability of VBM to separate cached data from free space, merge buffer segments of the buffer table into single disc operations when beneficial, reuse any buffer sectors that hold redundant data, and return buffer sectors to the free list in any order.

These and various other features, as well as advantages which characterize the present invention, will be apparent from a reading of the following detailed description and a review of the associated drawings.

DETAILED DESCRIPTION

Figure 1:
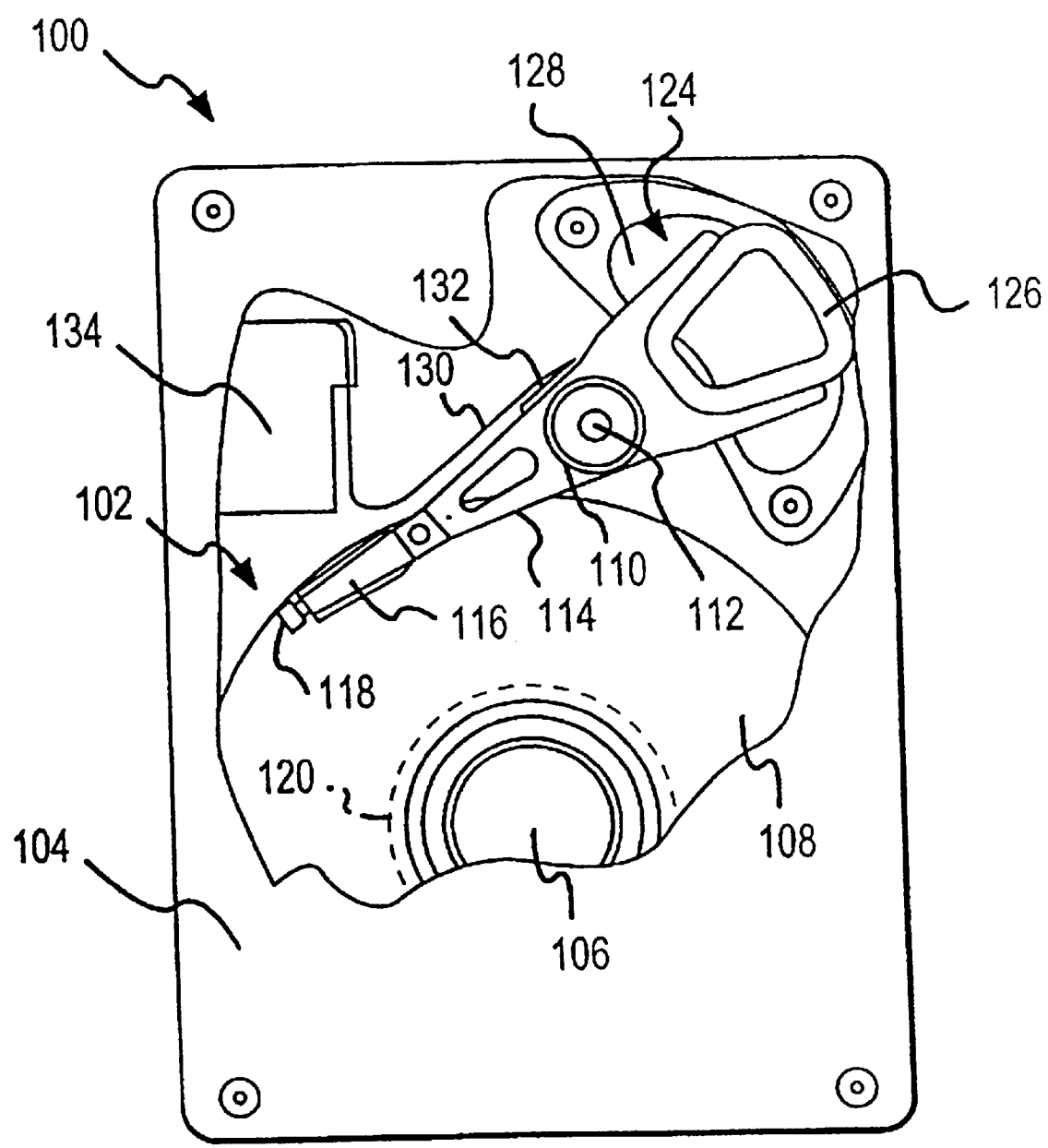
FIG. 1 is a plan view of a disc drive incorporating a preferred embodiment of the present invention showing the primary internal components.

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive 100 in a conventional manner. The components include a spindle motor 106 which rotates one or more discs 108 at a constant high speed. Information is written to and read from tracks 160 (FIG. 3) on the discs 108 through the use of an actuator assembly 110, which rotates about a bearing shaft assembly 112 positioned adjacent to the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118 which includes an air bearing slider enabling the head 118 to fly in close proximity above the corresponding surface of the associated disc 108.

The spindle motor 106 is typically de-energized when the disc drive 100 is not in use for extended periods of time. The heads 118 are moved over park zones 120 near the inner diameter of the discs 108 when the drive motor is de-energized. The heads 118 are secured over the park zones 120 through the use of an actuator latch arrangement, which prevents inadvertent rotation of the actuator assembly 110 when the heads 118 are parked.

The radial position of the heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112 and the heads 118 are caused to move across the surfaces of the discs 108.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and for amplifying read signals generated by the heads 118 during a read operation. The flex assembly terminates at a flex bracket 134 for communication through the base deck 102 to a disc drive printed circuit board (not shown) mounted to the bottom side of the disc drive 100.

Figure 2:
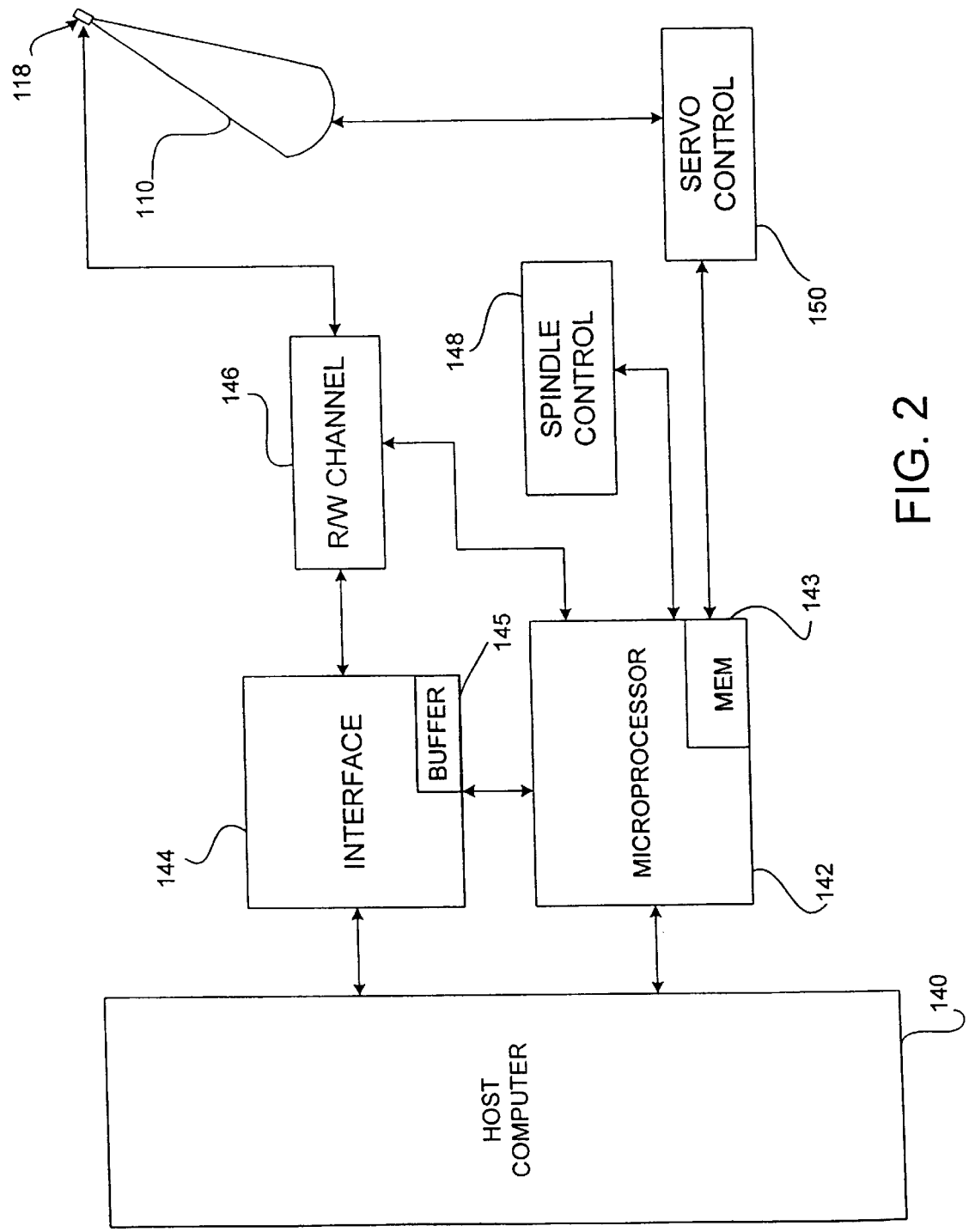
FIG. 2 is a functional block diagram generally showing the main functional components used to control the disc drive of FIG. 1.

Referring now to FIG. 2, shown therein is a functional block diagram of the disc drive 100 of FIG. 1 generally showing the main functional circuits which are resident on the disc drive printed circuit board and used to control the operation of the disc drive 100. The disc drive 100 is shown in FIG. 2 to be operably connected to a host computer 140 in which the disc drive 100 is mounted in a conventional manner. Control communication paths are provided between the host computer 140 and a disc drive microprocessor 142, the microprocessor 142 generally providing top level communication and control for the disc drive 100 in conjunction with programming for the microprocessor 142 stored in microprocessor memory (MEM) 143. The MEM 143 can include random access memory (RAM), read only memory (ROM), and other sources of resident memory for the microprocessor 142. The discs 108 are rotated at a constant high speed by a spindle control circuit 148. The radial position of the heads 118 is controlled through the application of current to a coil in the actuator assembly 110. A servo control circuit 150 provides such control.

Data is transferred between the host computer 140 and the disc drive 100 by way of a disc drive interface 144, which includes a buffer 145 to facilitate high speed data transfer between the host computer 140 and the disc drive 100. Data to be written to the disc drive 100 are thus passed from the host computer 140 to the buffer 145 and then to a read/write channel 146, which encodes and serializes the data and provides the requisite write current signals to the heads 118. To retrieve data that has been previously stored by the disc drive 110, read signals are generated by the heads 118 and provided to the read/write channel 146. The interface 144 performs read signal decoding, error detection, and error correction operations. The interface 144 then outputs the retrieved data to the buffer 145 for subsequent transfer to the host computer 140. Such operations of the disc drive 100 are well known in the art and are discussed, for example, in U.S. Pat. No. 5,276,662 issued Jan. 4, 1994, to Shaver et al.

Figure 3:
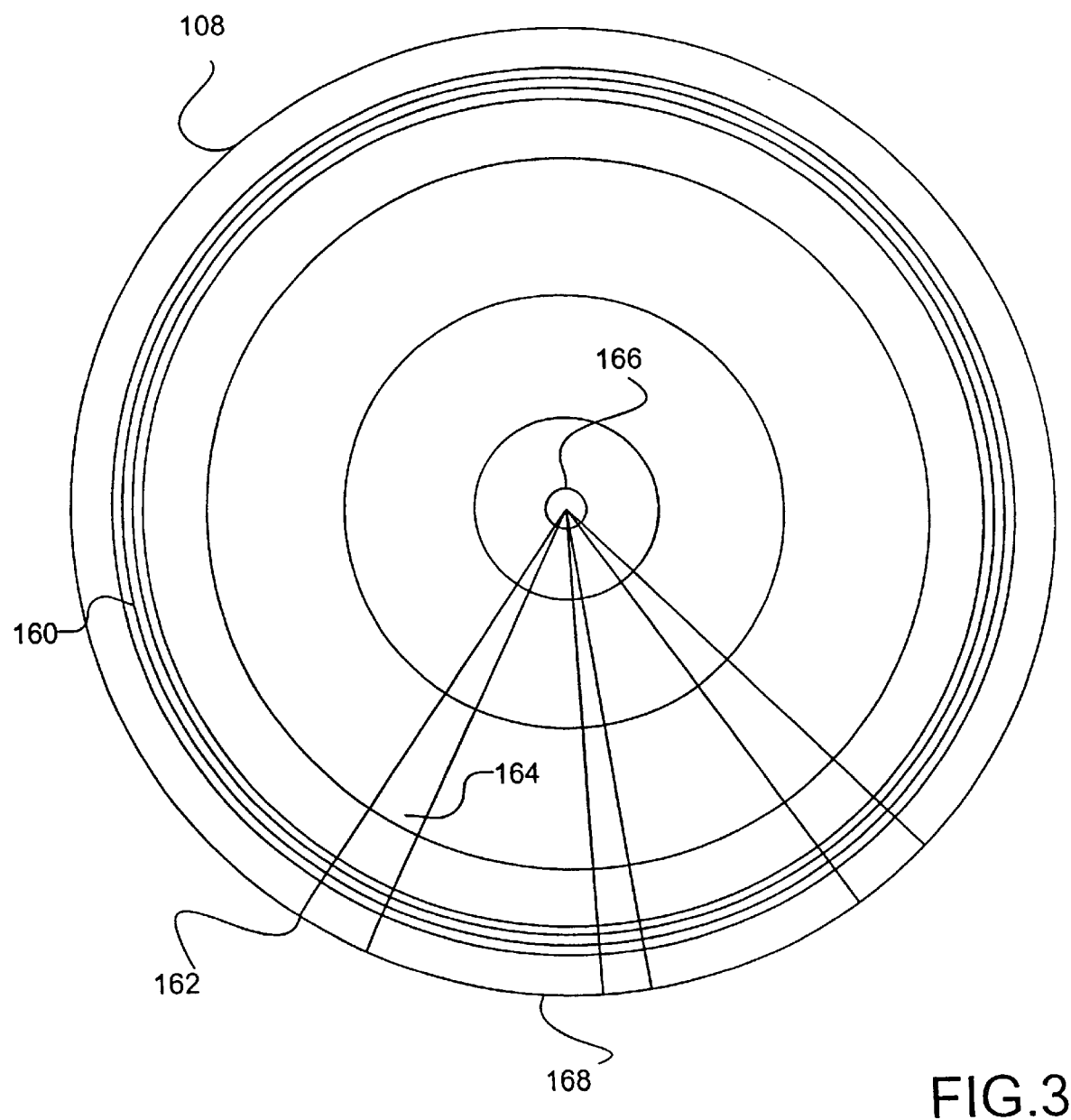
FIG. 3 is a plan view of the disc generally showing the main components on the surface of the disc.

Referring now to FIG. 3, shown therein is a plan view of the disc 108, generally showing the main components on the surface of the disc 108. The discs 108 are circumferentially divided into a plurality of concentric circular tracks 160. The number of tracks 160 per disc 108 will vary with each particular manufactured disc 108. A one-time revolution (INDEX) 162 around each track 160 is typically indicated by a mark that extends the radius of the disc 108

The disc 108 is radially divided into a plurality of servo segments 164. The servo segments 164 begin at the center 166 of the disc 108 and terminate at the outer edge 168 of the disc 108. As with the number of tracks 160 per disc 108, the number of servo segments 164 per disc 108 varies with each particular manufactured disc 108. Each track 160 is composed of spaced servo segments 164 with data sectors between the servo segments 164.

Figure 4:
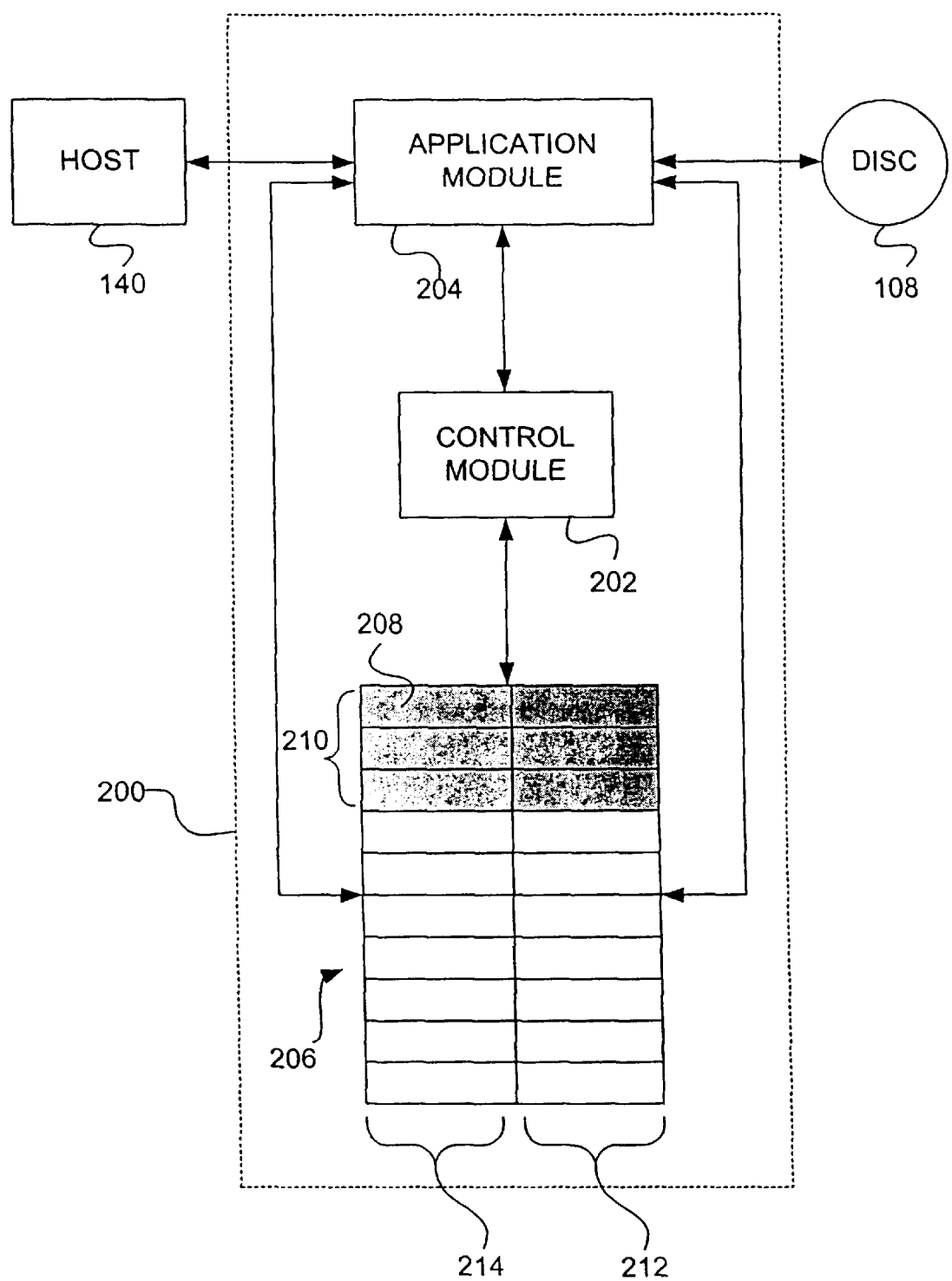
FIG. 4 is a functional block diagram of the buffer management system in accordance with a preferred embodiment of the present invention.
Figure 12:
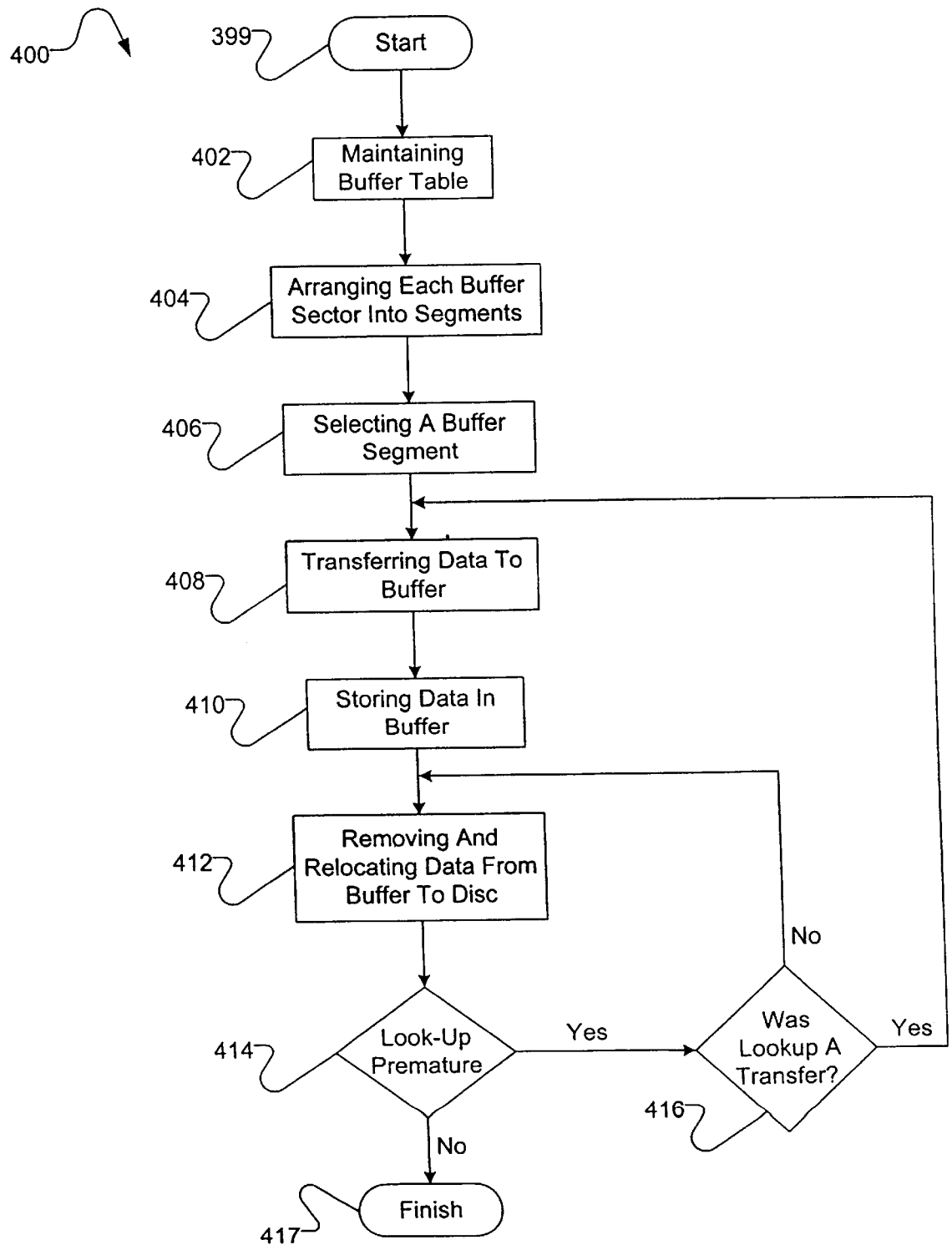
FIG. 12 is a flow diagram generally illustrating the operation of the present invention.

In a general sense, FIG. 12 illustrates, in operations 399 through 417, a preferred embodiment of the overall operation 400 of the buffer management system for the buffer 145, in accordance with the present invention. In operation 402, a buffer table 206 (FIG. 4) is maintained by representing the buffer 145 as divided into a plurality of equally sized buffer sectors 208 (FIG. 4). In operation 404, the buffer sectors 206 are arranged into circularly linked lists, referred to as buffer segments 210 (FIG. 4). In operation 406, a particular buffer segment 210 is arbitrarily selected by the control module 202 to store the data file. In operation 408, data, which is actually transferred from a host 140 (FIG. 4) to the buffer 145 as a file, is represented as being transferred into a buffer segment 210. In operation 410, the data file is stored in the buffer 145 for an indefinite period of time. The data file is represented as stored in the buffer segment until, in operation 412, the data is removed from the buffer 145 and relocated to the disc 108, thus effectuating the transfer from the host 140 to the disc 108. In operation 414, a determination is made as to whether either "look-up," i.e., the transfer or removal, was administered prematurely. If not, then the process is finished. However, if a look-up was premature, then, if the look-up was a transfer, operation 416 re-initiates the transfer in operation 408. If the look-up was a removal and replacement, then operation 416 reinitiates the removal in operation 412.

Referring now to FIG. 4, a functional block diagram of a buffer management system 200 for managing the transfer of data to and from the buffer 145 is shown. The buffer management system 200 manages the transfer of data between the host computer 140 and the disc 108 through the implementation of three main components: a control module 202, an application module 204, and a buffer table 206. The buffer table 206 is divided into n equal buffer sectors 208, each having a capacity to store 512 bytes. Each buffer sector 208 is further incorporated into a circularly linked list, or buffer segment 210. The buffer table 206 can be divided into as many as n buffer segments 210 or can be made of only one buffer segment 210 having n buffer sectors 208. Table 1, below, depicts a buffer table 206 containing n=9 buffer sectors 208 and two circularly linked buffer segments 210.

TABLE 1

| Sector # (offset) | Next sector instruction |
|---|---|
| 0 | 1 |
| 1 | 2 |
| 2 | 3 |
| 3 | 0 |
| 4 | 7 |
| 5 | 6 |
| 6 | 8 |
| 7 | 5 |
| 8 | 4 |

For simplicity, Table 1 can be broken down into 2 independent buffer segments 210, as shown in Tables 2 and 3:

TABLE 2

| Sector # (offset) | Next sector Instruction |
|---|---|
| 0 | 1 |
| 1 | 2 |
| 2 | 3 |
| 3 | 0 |

TABLE 3

| Sector # (offset) | Next sector instruction |
|---|---|
| 4 | 7 |
| 5 | 6 |
| 6 | 8 |
| 7 | 5 |
| 8 | 4 |

With respect to the buffer table 206, each buffer sector 208 contains two instructions important to the operation of the buffer management system 200: an offset value 214 ("offset") and a next sector instruction value 212 ("next sector instruction"). Both instructions are crucial to the operation of the buffer management system 200 in that, taken as a whole, the offset 214 and the next sector instruction 212 define the circular aspect of the buffer segment 210. For example, referring back to Table 3, the values in the left column are referred to as the offset values 214 and the values in the right column are referred to as the next sector instruction values 212. When the application module 204 is positioned at current buffer sector 208 "4," the application module 204 reads the next sector instruction 212 and moves to the next buffer sector 208 "7". Once positioned at current buffer sector 208 "7," the application module 204 reads the next sector instruction 212 and moves to the next buffer sector 208 "5." This procedure is repeated until the application module 204 is positioned back to the buffer sector 208 having offset 214 value "4," thus enclosing the circularly linked segment 210. According to the preferred embodiment, the maintenance of the buffer table 206 and the operation of the application module 204 on the buffer table 206 are both administered by the control module 202. Greater detail of the application module 204 and the control module 202 are discussed below.

Figure 5:
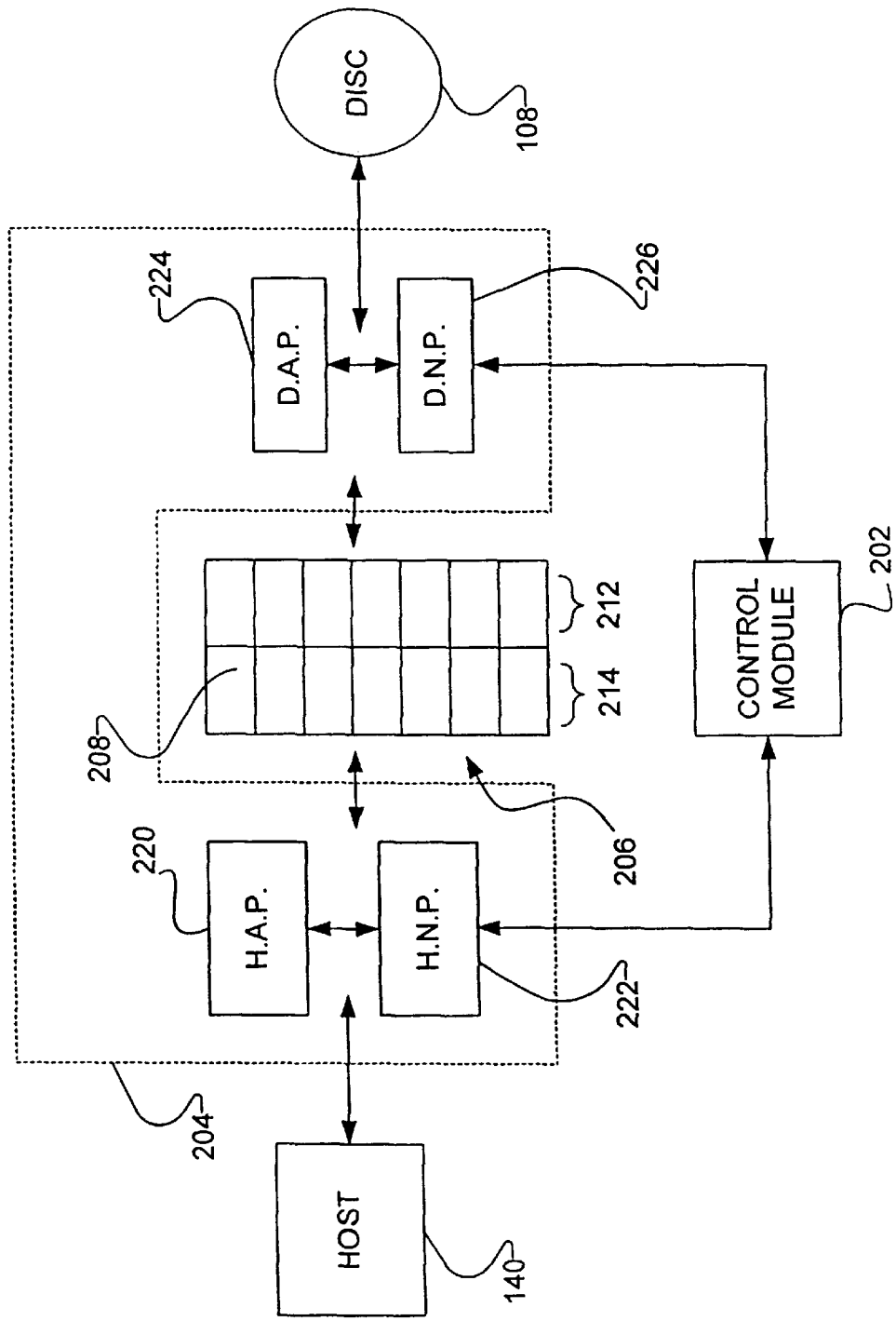
FIG. 5 is a functional block diagram of the buffer management system more particularly focusing on the application and control modules of FIG. 4.

Referring now to FIG. 5, a more specific functional block diagram of the system 200 of FIG. 4 is shown. In particular, functional blocks of the components of the application module 204 are depicted. The application module 204 is the hardware component of the buffer management system 200. The application module 204 is divided into two main sub-modules: a host address pointer (HAP) 220 coupled to a host next pointer (HNP) 222 and a disc address pointer (DAP) 224 coupled to a disc next pointer (DNP) 226. The application module 204 walks through the buffer table 206 in segment-by-segment fashion. The host next pointer 222 and the disc next pointer 226 effectively control the positioning of the next buffer sector 208 position of the host address pointer 220 and the disc address pointer 224, respectively. As noted above, the operation of the application module 204 is controlled through the control module 202.

The host address pointer 220 is responsible for committing the data blocks to the buffer 145. In the preferred embodiment, committing data to the buffer 145 is accomplished by reference to the buffer table 206. In its operation, the host next pointer 222 communicates to the host address pointer 220 the value of the "next" sector 208 of the particular buffer segment 210 upon which the host address pointer 220 is operating. The host next pointer 222 receives the offset value 214 of the "next" sector 208 in the buffer segment 210 from the next sector instruction 212. The host address pointer 220 walks through the particular buffer segment 210 in response to the next sector instruction 212 read by the host next pointer 222. After the host address pointer 220 commits data to the current buffer sector 208, it immediately jumps to the next buffer sector 208 as communicated by the host next pointer 222. Ultimately, the next sector instruction value 212 of the last buffer sector 208 will equal the offset value 214 of the initial buffer sector 208 referenced by the host address pointer 220 in the buffer segment 210. This is the point at which the circular segment wraps. The host address pointer 220 continues to walk through the segment 210, wrapping as needed, until all the data for the current command has been transferred.

When data is to be transferred from the buffer 145 to the disc 108, the application module 204 generally operates in the same fashion as when data is transferred from the disc 108 to the buffer 145. The disc address pointer 224 is responsible for committing the data from the buffer 145 to the disc 108. In the preferred embodiment, committing data to the disc 108 is accomplished by reference to the buffer table 206. In its operation, the disc next pointer 226 communicates to the disc address pointer 224 the position of the "next" buffer sector 208 of the particular buffer segment 210 upon which the disc address pointer 226 is operating. The disc next pointer 226 receives the offset value 214 of the "next" buffer sector 208 in the buffer segment 210 from the next sector instruction 212. The disc address pointer 224 walks through the particular buffer segment 210 in response to the next sector instruction 212 read by the disc next pointer 226. After the disc address pointer 224 commits data from the buffer sector 208 to the disc 108, it immediately jumps to the next buffer sector 208 as dictated by the disc next pointer 226. Ultimately, the next sector instruction value 212 of the last buffer sector 208 will equal the offset value 214 of the initial buffer sector 208 referenced by the disc address pointer 224 in the buffer segment 210. This is the point at which the circular segment wraps. The disc address pointer 224 continues to walk through the segment 210, wrapping as needed, until all the data for the current command has been transferred.

With respect to the operation of disc address pointer 224, data is transferred from the buffer 145 in sector-by-sector fashion. Once the data has been extracted from the particular buffer sector 208, it is transferred to the disc 108 according to the particular servo segment 164 and track 160 upon which the file is to be located.

Figure 6:
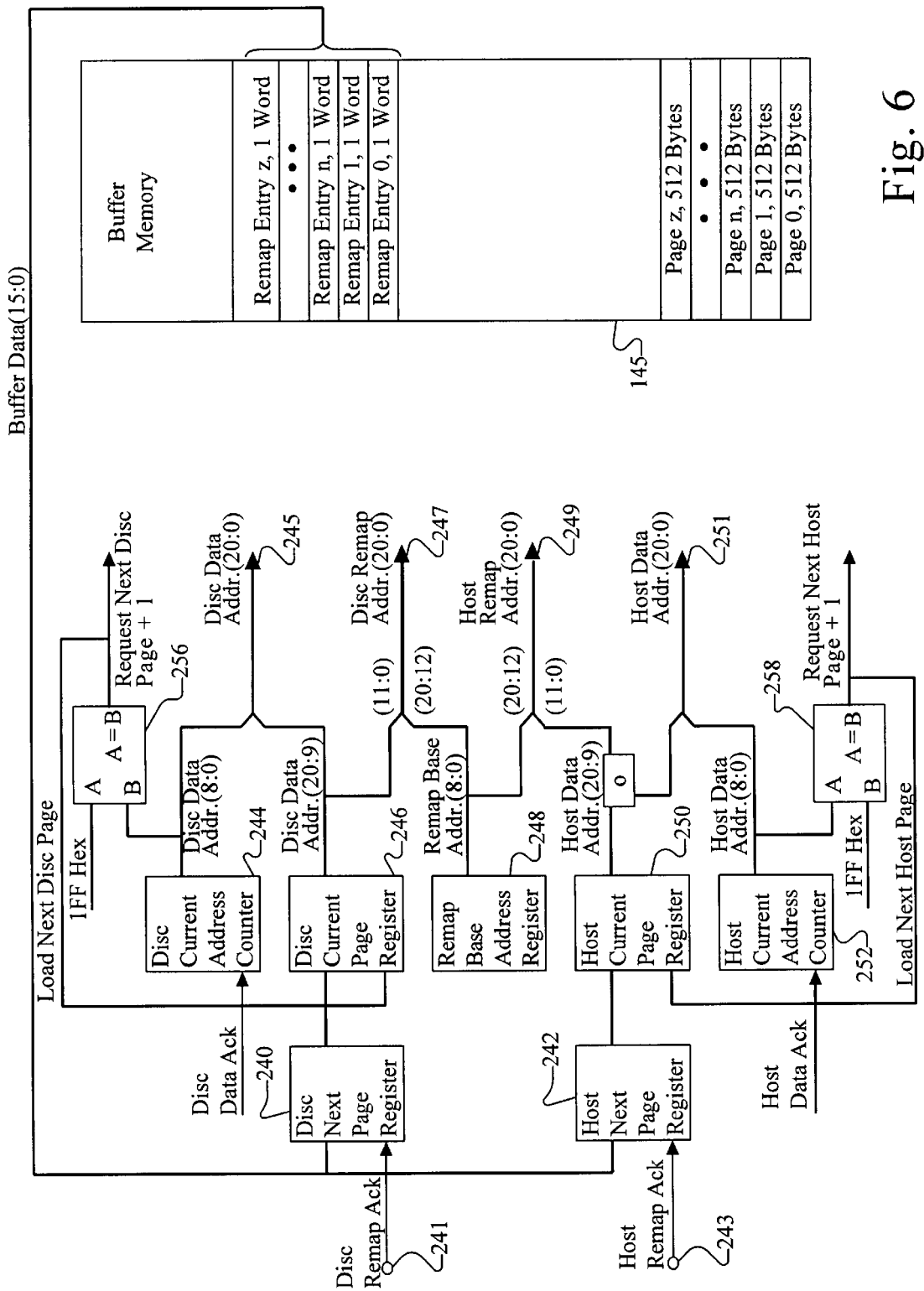
FIG. 6 is a schematic representation of the components of the application module of FIG. 4.

Referring now to FIG. 6, a schematic representation of the application module 204 is shown operating on the buffer 145. The disc current address counter 244 and the disc current page register 246 form the disc address pointer 224. Similarly, the host current address counter 252 and the host current page register 250 form the host address pointer 220. The disc next page register 240 and the host next page register 242 serve as the disc next pointer 226 and the host next pointer 222, respectively. The remap base address register 248 sets the disc remap address 247 and the host remap address 249 at the base of the VBM table 206 in the buffer 145. Accordingly, in a preferred embodiment, the output of the remap base address register 248 uses either the disc remap address 247 or the host remap address 249 to address the buffer 145, depending upon which acknowledgment control line (241 or 243) is enabled. If the disc interface controller requests data to be read from the buffer 145, then the disc remap acknowledgment line 241 is enabled and the disc remap address 247 is used to access the buffer 145. If the host interface controller requests data to be written to the buffer 145, then the host remap acknowledgement line 243 is enabled and the host remap address 249 is used to address the buffer 145.

The disc next page register 240 loads the disc current page register 246 with the next sector instruction value 212 of the next sector 208 that is to be read from the buffer table 145. Data is read from the current sector 208 so long as the disc data address line 245 originating from the output of the disc current address counter 244 is enabled. The output of the disc current address counter 244 is tied to a sector comparator 256. The value of the disc current address counter 244 is input B to the sector comparator 256. Input A of the comparator 256 is a constant value of the buffer sector 208 size, typically 512 bytes. When the value of the disc current address counter 244 equals input A, a signal is transmitted from the output of the comparator 256 to the disc current page register 246 requesting a switch to the next buffer sector 208, which has a value loaded in the disc current page register 246 by the disc next page register 240. The next buffer sector 208 value is defined by the next sector instruction value 212 loaded into the disc next page register 240 from the buffer 145.

The host next page register 242 loads the host current register 250 with the next sector instruction value 212 of the next sector 208 that is to be written to the buffer 145. Data is read from the current sector 208 so long as the host data address line 251 originating from the output of the host current address counter 252 is enabled. The output of the host current address counter 252 is tied to a sector comparator 258. The value of the host current address counter 252 is input A to the sector comparator 258. Input B of the comparator 258 is a constant value of the buffer sector 208 size, typically 512 bytes. When the value of the host current address counter 252 equals input B, a signal is transmitted from the output of the comparator 258 to the host current page register 250 requesting a switch to the next buffer sector 208, which has a value loaded in the host current page register 250 by the host next page register 242. The next buffer sector value is the next sector instruction value 212 loaded into the host next page register 242 from the buffer 145.

Figure 13:
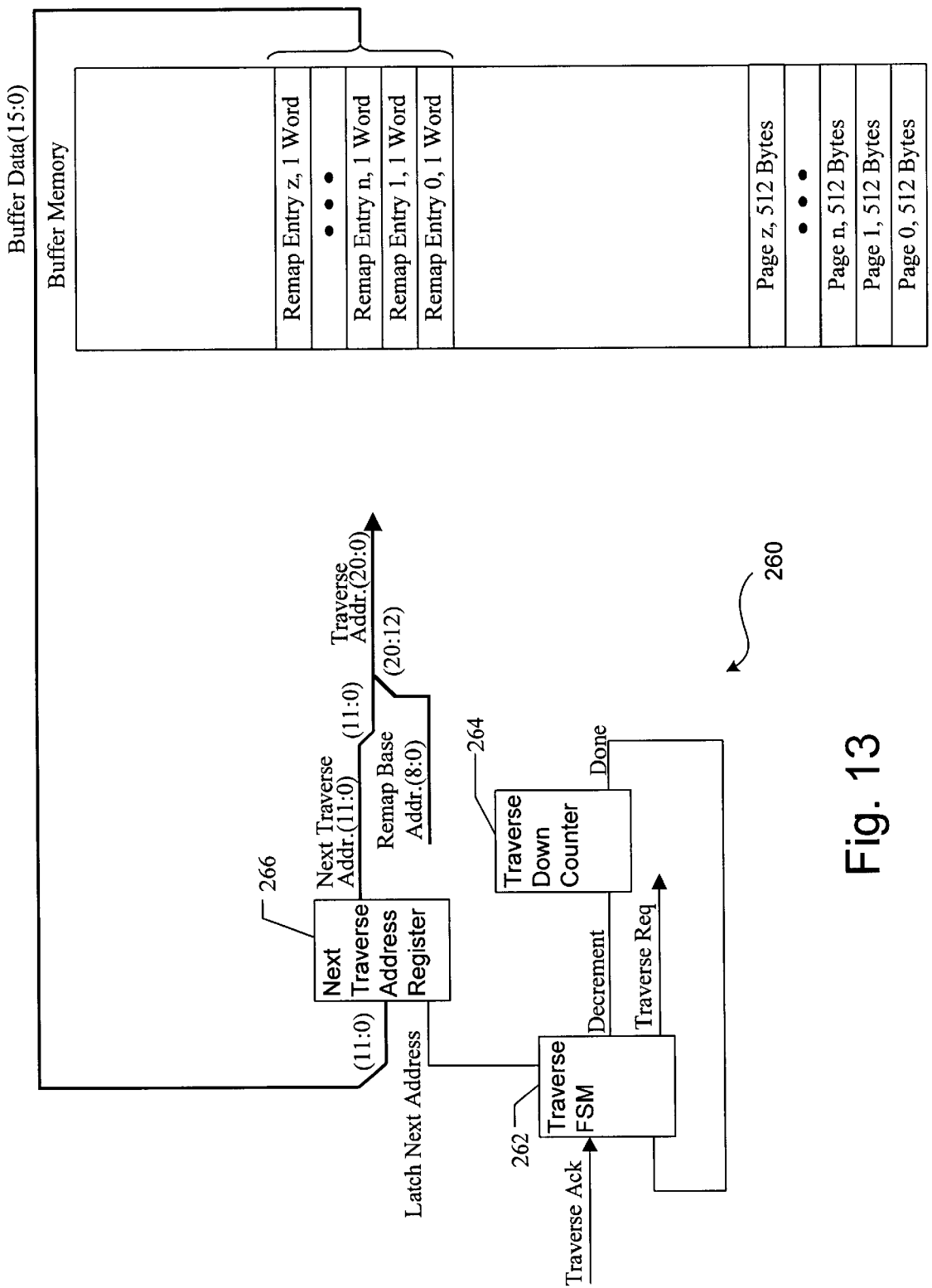
FIG. 13 is a schematic representation of the traverser component of the application module of FIG. 4.

Referring now to FIG. 13, a schematic representation of the traversal component of the application module 204 is shown. The traversal component 260 includes a traverse state machine 262, a traverse down counter 264, and a next traverse address register 266. The traverse state machine 262 is loaded with the value 214 of the offset base address. The offset value 214 is latched into the next traverse address register 266 as the next sector 208 position for the traverse component 260. The traversal component 260 traverses the application module 204 over a buffer segment 210 once the traverse state machine 262 initializes the traverse down counter 264. The traversal component 260 receives the traverse address from the next traverse address register 266 and continually executes a traversal of the application module 204 until the traverse down counter 264 completes counting. The count for the traverse down counter 264 is loaded by the microprocessor 142, thereby allowing the application module 204 to iteratively hop a particular buffer segment 210 a predetermined number of times. The next sector instruction value 212 dictates the next sector 208 to traverse and is communicated to the traversal component 260 through the next traverse address register 266. After the value 214 of the offset base address is initially transmitted to the traverse state machine 262, the next sector instruction value 212 is the only control parameter controlling the subsequent sector 208 of traversal until the traverse down counter 264 completes counting, at which time, the traversal component 260 is initialized to await the next value 214 of the offset base address.

As noted above, maintenance of the buffer table 206 and operation of the application module 204 are both administered by the control module 202. The control module 202 is the software component of the buffer management system 200. The control module 202 maximizes the method of write caching by ensuring that the maximum possible number of sectors 208 of the buffer 145 are available to the host 140 for write commands at any given time. In short, the control module 202 provides a mechanism for maintaining the buffer table 206 that is used by the application module 204 to direct data transfers into and out of the data buffer 145, via the host 220 and disc 226 address pointers.

Figure 7:
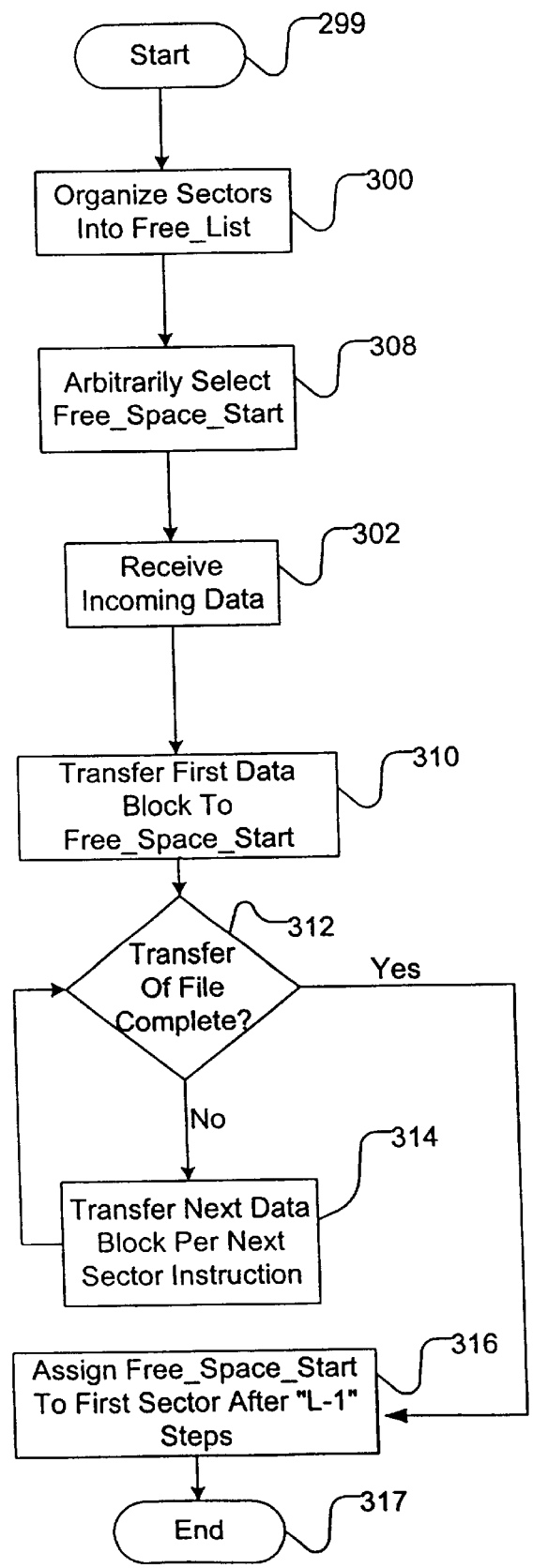
FIG. 7 is a flow diagram illustrating the operation of the control module in response to a write instruction by a host computer.

Referring to FIG. 7, a flow diagram, generally described in operations 299 through 317, illustrates the operation of the control module 202 when employed to transfer data from the host 140 to the buffer 145. In operation 300, the control module 202 organizes the sectors 208 of the buffer 145 into a free_list in order to maximize the possible number of sectors 208 available to the host 140 for write commands at any given time. The free_list is initialized to be a circularly linked segment 164 of all the free sectors 208 in the write buffer 145. Table 4 is an illustration of the free_list, as initialized:

TABLE 4

| Sector # (offset) | Next sector instruction |
|---|---|
| 0 | 1 |
| 1 | 2 |
| 2 | 3 |
| ... | ... |
| ... | ... |
| n − 2 | n − 1 |
| n − 1 | 0 |

Once the control module 202 completes organization of the sectors 208 into the free_list, the physical transformation of the data from the host 140 to the buffer 145 is initiated. It is during this process that the control module 202 divides the buffer table 206 into one or more buffer segments 210. In operation 308, the control module 202 arbitrarily selects a buffer sector 208—in the preferred embodiment, referred to as the first index sector 208—in the free_list as "free_space_start," which is the buffer sector 208 that the control module 202 selects as the beginning sector 208 for data transfer to the buffer 145. The control module 202 controls the application module 204 such that the host address pointer 220 is positioned to the first index sector 208 labeled free_space_start. In operation 302, the control module 202 receives the incoming data to be cached. In operation 310, the control module 202 directs the host address pointer 220 to transfer the first block of the file to the sector identified as free_space_start. In operation 312 the control module 202 determines whether transfer of the file is complete. If all data blocks have been transferred, the control module jumps to operation 316. However, if the transfer is not complete, then, in operation 314, the control module 202 positions the host address pointer 220 to the next "index" sector 208 (each current position of the host address pointer 220 is preferably referred to as the "index" sector) pursuant to the next sector instruction 212 of the previous index sector 208. The host address pointer 220 transfers the data block as the host next pointer 222 references the next index sector 208. In operation 316, once the control module 202 determines that the transfer of the file is complete, it assigns the label "free_space_start" to the sector 208 in the free_list that appears directly after the last buffer sector 208 in the current buffer segment 210. The determination of the size of the buffer segment 210 and where in the buffer table 206 the division of the free_list into buffer segments 210 occurs is described in more detail by FIG. 8 and Table 5.

Figure 8:
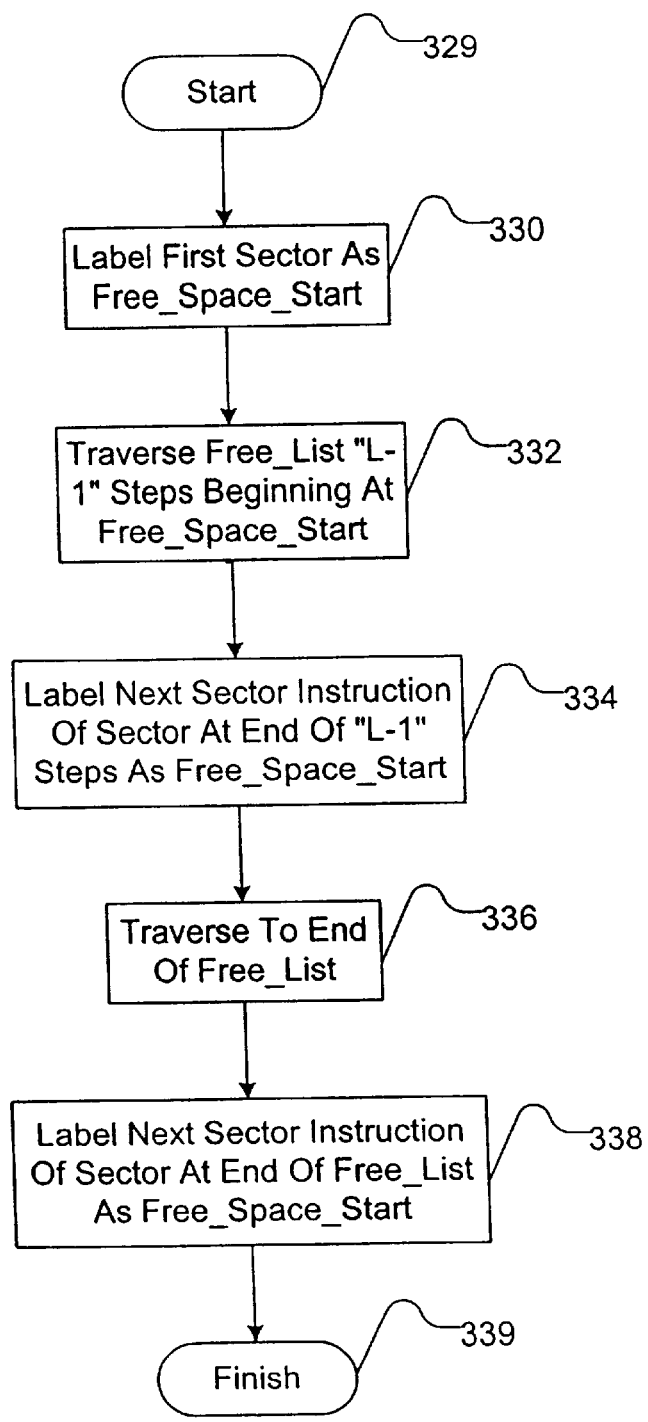
FIG. 8 is a flow diagram illustrating the arrangement of sectors of the free_list into one or more segments.

Referring to FIG. 8, a flow diagram, generally described in operations 329 through 339, illustrates the arrangement of the sectors 208 of the free_list into one or more segments 210. The control module 202 effectively arranges the free_list into one or more circularly linked lists segments 210 once a command of length "L" buffer sectors 208 is sent by the host 140 to the buffer management system 200. In operation 330, which is the same as operation 310 in FIG. 7, the control module 202 directs the host address pointer 220 to transfer the first block of the file to the first index sector 208, which, in the preferred embodiment, is labeled "free_space_start." Operation 332 locates the last buffer sector 208 of data for this particular command, i.e., the last sector 208 of that particular buffer segment 210 by traversing with the traversal component 260 the singly linked free_list starting at free_space_start and going "L−1" sectors down the buffer table 206. Operation 334 designates the value of the next sector instruction 212 of the buffer sector 208 corresponding to "L−1" steps down the table as "free_space_start." Since this buffer sector 208 now incorporates the next sector instruction 212 "free_space_start," the circularly linked list is enclosed to illustrate that the particular buffer segment 210 is an independent list from the free_list.

Operation 336 traverses the remaining buffer sectors 208 in the free_list in order to illustrate the remaining circularly linked list. In operation 338, designation of the next sector instruction 212 of the last sector 208 in the free_list as "free_space_start" encloses the remaining sectors 208 of the buffer table 206 in an independent circularly linked list. Thus, the end result is an illustration of how the free_list is divided into one or more buffer segments 210 once the host 140 transfers data to the buffer 145. Table 5 depicts a better illustration of the arrangement of buffer sectors 208 into buffer segments 210 by applying an instruction of L=3 to the initialized free_list of Table 4.

TABLE 5

| Sector # (offset) | Next sector instruction |
|---|---|
| 0 | 1 |
| 1 | 2 |
| 2 | 0 |
| 3 | 4 |
| ... | ... |
| n − 2 | n − 1 |
| n − 1 | 3 |

Whereas sectors 0 through 2 represent the buffer segment 210 to which the control module 202 is currently instructing the host address pointer 220 to fill with data, sectors 3 through "n−1" represent the remaining buffer sectors 208 in the free_list. In this example, sector "3" is the next "free_space_start" position upon which the control module 202 will direct the host address pointer 220 the next time that the host 140 implements a transfer of data. Hence, the free_list of the buffer table 206 is divided, in this example, into two separate buffer segments 210, one of length 3 and one of length "n−3." Similar manipulations can be done in order to either further subdivide various buffer segments 210 or to merge segments 210 back into single loops.

Figure 9:
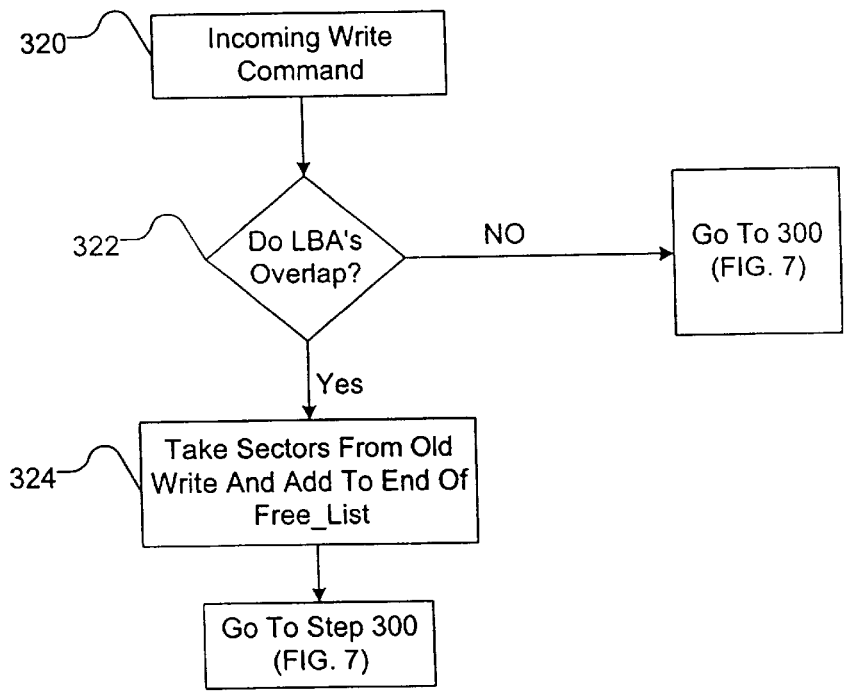
FIG. 9 is a flow diagram illustrating the mending process.

Referring now to FIG. 9, a flow diagram, illustrating a mending process programmed in the control module 202 that is initiated any time a write command is issued, is shown. Although the mending process of FIG. 9 is actually a separate process than that defined in FIG. 8, the two processes are concurrent with each other and the mending process ultimately concludes with operation 300. The mending process is initiated, in operation 320, when the host 140 sends a new write command that is received by the control module 202. In operation 322, once a new write command is received by the control module 202, the control module 202 first checks to determine whether any of the logical block addresses (LBA's) of the data from the new command overlap any of the LBA's of data cached into the buffer sectors 208 from previous commands. If an overlap is not found, then operation 300 is initiated and the data is transferred to the buffer 145 in accordance with the flow diagram in FIG. 8.

If an overlap of LBA's is found, then the control module, in operation 324, takes the buffer sectors 208 corresponding to the old write command and adds them to the end of the free_list. This is accomplished by replacing the next sector instruction value 212 of the buffer sector 208 located at the end of the free_list with the old write sectors 208. The data from these buffer sectors 208 is considered "redundant" data; thus the buffer sector 208 is mended to the free_list. Once the two buffer sectors 208 are mended, in operation 324, operation 300 is initiated and the data is transferred to the buffer 145 in accordance with the flow diagram in FIG. 8. Table 6 is an illustration of the buffer table 206 as it goes through the mending process depicted in FIG. 8.

TABLE 6

| Sector # (offset) | Next sector instruction before "mend" | Next sector instruction after "mend" |
|---|---|---|
| 0 | 1 | 1 |
| 1 | 2 | 2 |
| 2 | 0 | 4 |
| 3 | 4 | 0 |

TABLE 6-continued

| Sector # (offset) | Next sector instruction before "mend" | Next sector instruction after "mend" |
|---|---|---|
| 4 | 5 | 5 |
| 5 | 6 | 6 |
| 6 | 3 | 3 |

In this example, a list of L=3 has been mended to a list of L=4 to make a new list of L=7. An overlap was found with respect to the LBA of the data blocks contained in the buffer sectors 208 0, 1, and 2 and the LBA of data blocks related to a new write command. Hence, the mending process added the first index sector 208 (sector 0) of the "redundant" buffer segment 210 to the end of the original free_list (sectors 3, 4, 5, and 6) by replacing the next sector instruction 212 of sector 3 with the offset value 214 of sector 0. Sector 3 denotes the end of the free_list since 3 is the buffer sector 208 to where one complete circle of the singly linked list terminates. The control module 202 then administers the write command by positioning the host address pointer 222 at sector 0, which will be the first index sector 208 of the particular buffer segment 210.

Figure 10:
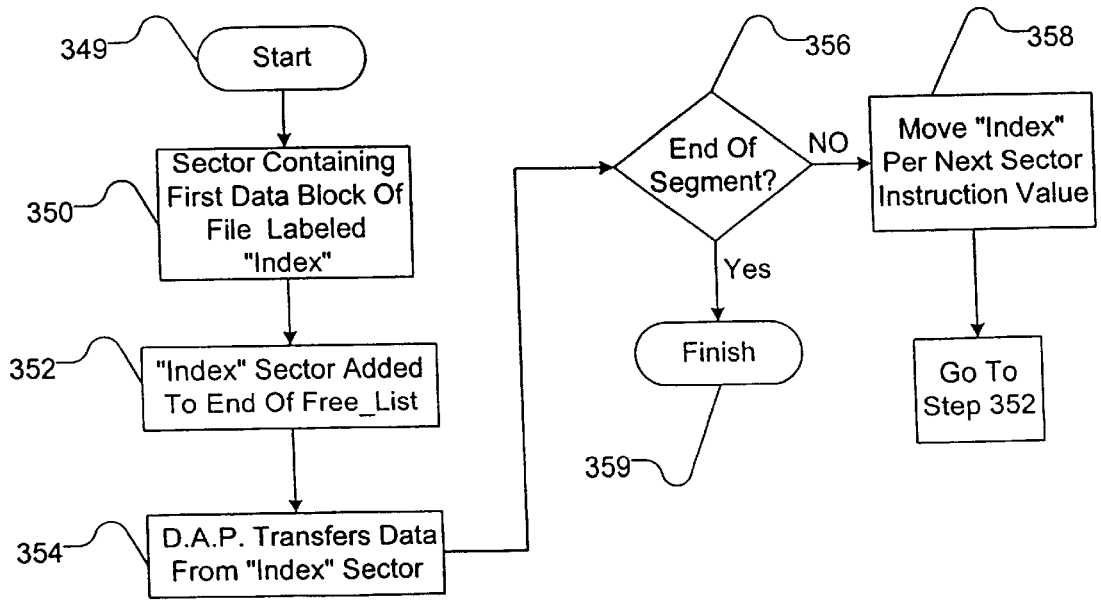
FIG. 10 is a flow diagram illustrating the operation of the control module when given an instruction to commit data from a buffer to a disc.

Referring to FIG. 10, a flow diagram, generally described in operations 349 through 359, illustrates the operation of the control module 202 when employed to transfer data from the buffer 145 to the disc 108. In operation 350, the buffer sector 208 storing the first data block of the file to be transferred is designated the "index" sector 208. In operation 352, the index sector 208 is added to the end of the free_list. In operation 354, the control module 202 directs the disc address pointer 224 to transfer the data block in the index sector 208 to the disc 108. Thus, at the instant the data from a buffer sector 208 is committed to the disc 108, that particular buffer sector 208 is immediately freed for use by next host 140 write commands.

In operation 356, the control module 202 determines whether all the data blocks within the file to be transferred have been committed to disc. If not, then, in operation 350 the control module 202 positions the disc address pointer 224 on the next "index" sector 208, as instructed by the next sector instruction 212 of the previous index sector 208. After positioning the disc address pointer 224 on the next index sector 208, the control module 202 jumps to operation 352 and repeats the procedure from there. Once the disc address pointer 224 has completely transferred the particular buffer segment 210 storing the file, as determined in operation 356, the task is finished and the control module 202 initializes the disc address pointer 210 to await instructions for subsequent transfers.

The process of adding buffer sectors 208 that are to be written to the disc 108 to the end of the free_list is greatly advantageous if a new write command comes to the control module 202 that is sequential in LBA space, thus immediately following on the disc 108, with the buffer sectors 208 being committed to the disc 108. This advantage is realized in that no manipulation of the buffer table 206 is necessary for the new write command because the control module 202 will write the new data to the disc 108 during the same operation as it is committing the old data to the disc 108. Table 7 provides the best analysis for an illustration of this process:

TABLE 7

| Sector # (offset) | Next sector instruction | |
|---|---|---|
| 0 | 1 | |
| 1 | 2 | ←disc address pointer |
| 2 | 3 | |
| 3 | 4 | ←free_space_start |
| 4 | 5 | |
| 5 | 6 | |
| 6 | 3 | |

In this example, the data relating to the new write command would have a first index sector 208 of "3," since sector 3 corresponds to the free_space_start. If the new write command is larger (more sectors) than the segment 210—in this case sectors 3, 4, 5, and 6—the control module 202 uses the free_list as a circular loop. Since the buffer sectors 208 which had stored the data being committed to the disc 108 have already been added to the end of the free_list, such sectors 208 become part of the circular free_list. The control module 202 directs the disc address pointer 224 to follow the host address pointer 220 (initiated at the first index sector 208), which, in turn, is following the disc address pointer 224 as data from buffer sectors 208 are committed to the disc 108. Hence, the control module 202 implements a real time circular loop using the disc 224 and host address 220 pointers.

One more advantage of the buffer management system 200 is the ability of the control module 202 to merge two or more cached commands into one buffer segment 210. It is advantageous to merge one buffer segment 210 into another because such a process allows the data to be written from the buffer 145 to the disc 108 in one operation. If two or more buffer segments 210 contain data files that are to be written onto adjacent servo segments 164 on the disc 108, the control module 202 will "merge" such buffer segments 210 of the buffer table 206 into one buffer segment 210.

Figure 11:
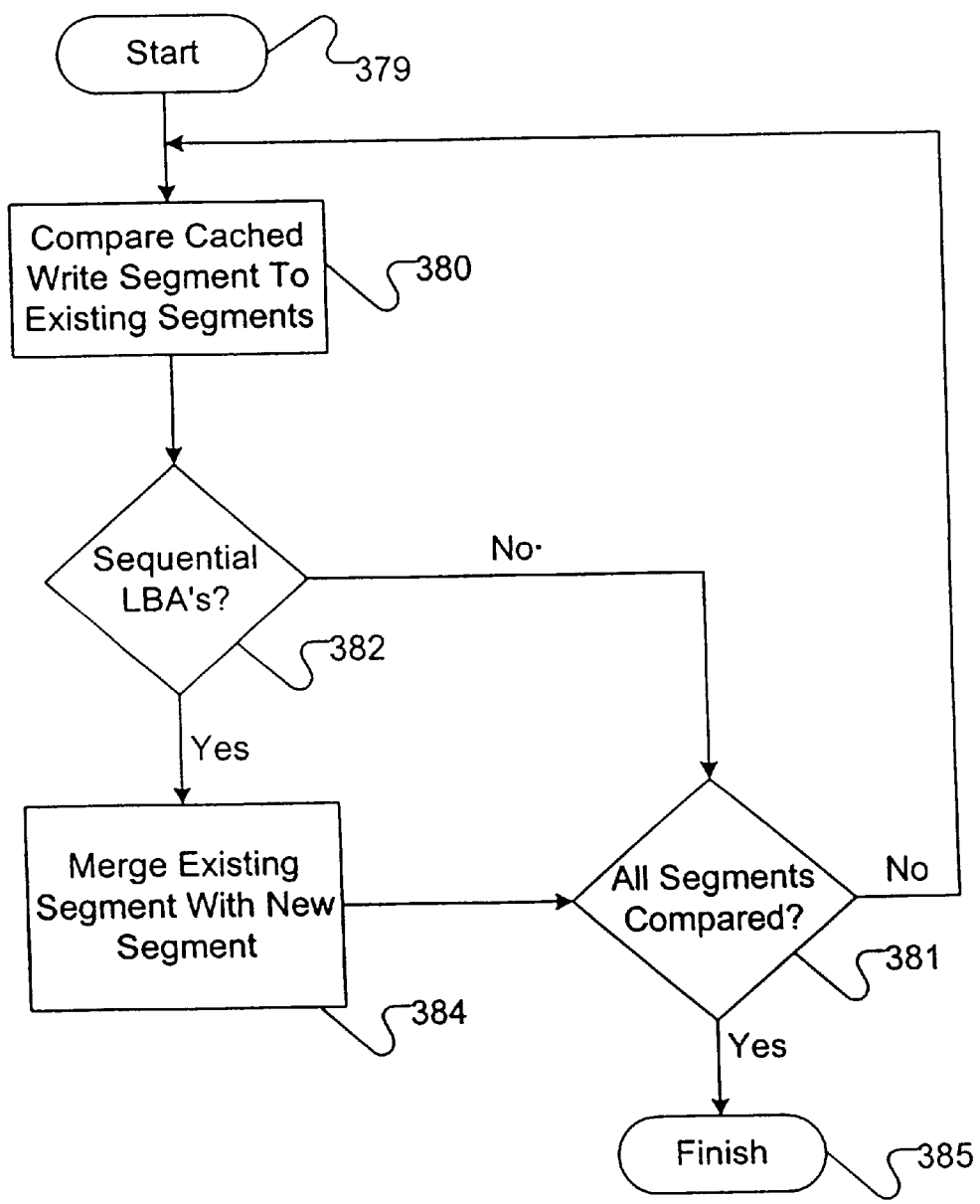
FIG. 11 is a flow diagram illustrating the merging process.

Referring to FIG. 11, a flow diagram, generally described in operations 379 through 385, illustrates the merging process of the control module 202. In operation 380, cached writes contained in buffer segments 210 are compared to determine whether the data files are to be committed to the disc 108 on adjacent, or sequential, servo segments 164. In operation 382, if such data is not to be committed to adjacent servo segments 164, then operation 381 checks to see if all buffer segments 210 in the table 206 have been compared to each other. If not, then the comparison routine of operation 380 is repeated. If all buffer segments 210 have been compared, the process has finished without merging any buffer segments 210.

If the data from the buffer segments 210 are to be committed in sequential position on the disc 108, then the actual merging process will begin in operation 384. In operation 384, the next sector instruction value 212 of the last buffer sector 208 of either of the buffer segments 210 is replaced with the offset value 214 of the first index sector 208 of the other buffer segment 210. Hence, the two segments 210 are merged into one circularly linked list. Once the merge is complete, the process is initiated again with operation 380 until all buffer segments 210 are compare to one another, as determined by operation 381. In essence, this is an ongoing process due to the frequency of cached writes to the buffer 145. Tables 8 and 9 provide further illustration of the merging process operation 384:

TABLE 8

| Sector # (offset) | Next sector instruction |
|---|---|
| 0 | 1 |
| 1 | 0 |
| 2 | 3 |
| 3 | 6 |
| 4 | 5 |
| 5 | 4 |
| 6 | 2 |

TABLE 9

| Sector # (offset) | Next sector instruction |
|---|---|
| 0 | 1 |
| 1 | 4 |
| 2 | 3 |
| 3 | 6 |
| 4 | 5 |
| 5 | 0 |
| 6 | 2 |

In this example, Table 8 illustrates the buffer table 206 prior to the merge. Table 8 contains 3 separate buffer segments 210: segment 0:1, segment 4:5, and segment 2:3:6. In this illustration, the data blocks contained in segment 0:1 are to be placed on the disc 108 in adjacent servo segments 210. Therefore, since segments 0:1 and 4:5 are sequential on the disc 108, the control module 202 will merge the two buffer segments 210, resulting in Table 9. As shown, Table 9 only contains two buffer segments 210: segment 0:1:4:5, and segment 2:3:6.

In summary, the present invention may be viewed as a buffer management system (such as 200) for managing a transfer of data from a host computer (such as 140) to a recordable disc (such as 108) in a disc drive (such as 100). The disc drive (such as 100) operates on the host computer (such as 140). The recordable disc (such as 108) is radially divided into one or more equal servo segments (such as 164) and circumferentially divided into one or more rotational tracks (such as 160). Thus, the tracks (such as 160) are divided by the servo segments (such as 164).

The disc drive (such as 100) is of a type wherein data transfers between the host computer (such as 140) and the disc (such as 108) are effectuated by transferring a selected number of data blocks constituting a file from either the host computer (such as 140) or the disc (such as 108) to a buffer (such as 145) for temporary storage of the file. After temporary storage, the file is transferred to either the host computer (such as 140) or the disc (such as 108). According to the present invention, management of the buffer is accomplished by the buffer management system (such as 200), which includes a buffer table (such as 206), an application module (such as 204, and a control module (such as 202).

The buffer management system (such as 200) includes a buffer table (such as 206), which is divided into one or more equally sized buffer sectors (such as 208). Each one of the buffer sectors (such as 208) is a sector in a buffer segment (such as 210). The buffer segment (such as 210) is defined as a circular linked list within the buffer table (such as 206). The buffer management system (such as 200) also includes an application module (such as 204) to walk through each particular buffer segment (such as 210). The buffer table (such as 206) is divided into at least one buffer segment (such as 210). However, the buffer table (such as 206) may only be divided into as many buffer segments (such as 210) as the buffer table (such as 206) has buffer sectors (such as 208).

The buffer management system (such as 200) further includes a control module (such as 202), which creates and maintains the buffer table (such as 206). The control module (such as 202) is coupled with the application module (such as 204) in order to administer the walking through the buffer table (such as 206) by the application module (such as 204). The application module (such as 204) walks through the buffer table (such as 206) in response to a next sector instruction (such as 212) in an index sector (such as 208) upon which the application module (such as 204) is currently positioned. In case the data was committed—either to the disc (such as 108) or the buffer (such as 145)—prematurely, the control module (such as 202) includes a look-up routine (such as in operation 414) that re-initiates the application module (such as 204) to perform a subsequent look-up of the data.

The application module (such as 204) preferably includes a host address pointer (such as 220) for committing the data to the buffer (such as 145). The host address pointer (such as 220) is preferably coupled to a host next pointer (such as 222), which communicates the next sector instruction (such as 212) of the index sector (such as 208) to the host address pointer (such as 220). Hence, the next sector instruction (such as 212) controls positioning of the host address pointer (such as 220) within the particular buffer segment (such as 210).

The application module (such as 204) also preferably includes a disc address pointer (such as 224) for committing the data from the buffer (such as 145) to the disc (such as 208). The disc address pointer (such as 224) is preferably coupled to a disc next pointer (such as 226), which communicates the next sector instruction (such as 212) of the index sector (such as 208) to the disc address pointer (such as 224). Hence, the next sector instruction (such as 212) controls the positioning of the disc address pointer (such as 224) within the particular buffer segment (such as 210).

In a preferred embodiment, the buffer table (such as 206) includes a free list of sectors readily available to the system (such as 200) for temporary storage. When an existing data block is to be written to the disc (such as 108) from an index sector (such as 208), the control module (such as 202) mends the index sector (such as 208) into the free list of sectors so that the index sector (such as 208) will become available to the system (such as 200) as it is committed to the disc (such as 108). The control module (such as 202) arbitrarily selects the particular buffer segment (such as 210) from the free list and arbitrarily positions the host address pointer (such as 220) over a first index sector (such as 208) of the particular buffer segment (such as 210) when a write instruction is issued from the host (such as 140). The free list preferably includes any buffer segments (such as 210) that contained data either written to the disc 108 or considered redundant.

The control module (such as 202) also includes a merging routine (such as in operations 380 through 384). The merging routine (such as in operations 380 through 384) combines one or more buffer segments (such as 210) that are to be written onto adjacent servo segments (such as 164). The merging routine (such as in operations 380 through 384) transforms the plurality of buffer segments (such as 210) into one aggregate buffer segment (such as 210) that can be committed to the disc (such as 108) in one write process.

The present invention may also be viewed as a method (such as in operation 400) for managing a transfer of data from a host computer (such as 140) to a recordable disc (such as 108) in a disc drive (such as 100). The method (such as in operation 400) includes maintaining (such as in operation 402) a buffer table (such as 206), which is divided into one or more equal-sized buffer sectors (such as 208), and arranging (such as in operation 404) each of the buffer sectors (such as 208) into at least one buffer segment (such as 210). The buffer table (such as 206), which is a singly linked list, is divided into one or more buffer segments (such as 210), which are circularly linked lists. The method (such as in operation 400) further includes selecting (such as in operation 406) a particular buffer segment (such as 210) to temporarily store the file to be transferred from the host computer (such as 140) to the buffer (such as 145), as well as transferring (such as in operation 408) the file from the host computer (such as 140) to the buffer (such as 145) by walking through the particular buffer segment (such as 210) in response to a next sector instruction (such as 212) contained in an index sector (such as 208). The index sector is the buffer sector (such as 208) from which the data is being transferred.

The method (such as in operation 400) further includes storing (such as in operation 410) the file in the particular buffer segment (such as 210) for a temporary period of time and, eventually, removing (such as in operation 412) the file from the buffer (such as 145) and relocating the file to the recordable disc (such as 108) by walking through the particular buffer segment (such as 210) in response to the next sector instruction (such as 212) contained in the index sector (such as 208).

In a preferred embodiment, the method (such as in operation 400) in maintaining the buffer table (such as in operation 402) includes the step of creating (such as in operation 300) a free list of sectors that are readily available to accept a new data block. The method (such as in operation 400) in the selecting step (such as in operation 406) preferably includes arbitrarily selecting, once the command to write the file to the buffer (such as 145) is sent by the host computer (such as 140), a first index sector (such as 208) as a beginning to the particular buffer segment (such as 210) that will be used in the storing the data (such as operation 410). The method (such as in operation 400) in the arranging step (such as operation 404) preferably includes generating a buffer segment (such as 210) from the free list of sectors by beginning at the arbitrarly selected first index sector (such as 208) and traversing one fewer buffer sector than the selected number of data blocks in the file. Ultimately, in the preferred embodiment, the method (such as in operation 400) accepts (such as in operation 302) an incoming data file to be cached and places the incoming data file into the buffer segment (such as 210) at the index sector (such as 208).

As mentioned, the method (such as in operation 400) may arrange (such as in operation 404) the buffer table (such as 206) by organizing the sectors (such as 208) into one or more buffer segments (such as 210). However, the buffer table (such as 206) may only be divided into a maximum number of buffer segments (such as 210) equal to the number of sectors (such as 208) in the buffer table (such as 206). The method (such as in operation 400) may also mend (such as in operations 354–358) each sector (such as 208) that is to be committed to the disc (such 108) into the free list of sectors so that each sector (such as 208) is available to the system as it is committed to the disc (such as 108).

In a preferred embodiment, the method (such as in operation 400) compares (such as in operation 322) the data block to be stored in the buffer (such as 145) to each existing data block in all of the buffer segments (such as 210). If the comparison (such as in operation 322) reveals a redundancy between the existing data block and the data block to be stored in the buffer (such as 145), the buffer segment (such as 210), which stored the existing data block, is mended (such as in operations 354–358) to the free list. The method (such as in operations 354–358) also preferably merges (such as in operation 384) together one or more buffer segments (such as 210) containing data files that are to be written to adjacent servo segments (such as 208), thus only allowing the write operation to be executed one time for those segments 164.

In the preferred embodiment, the method (such as in operation 400) includes transferring (such as in operation 408) data to the buffer (such as 145) by walking through the particular buffer segment (such as 210) with a host address pointer (such as 220) coupled to a host next pointer (such as 222). The host next pointer (such as 222) communicates the next sector instruction (such as 212) to the host address pointer (such as 220). In essence, the next sector instruction (such as 212) controls positioning of the host address pointer (such as 220) within the particular buffer segment (such as 210). Further, the method (such as in operation 400) preferably includes removing and relocating (such as in operation 412) data from the buffer by walking through the particular buffer segment (such as 210) with a disc address pointer (such as 224) coupled to a disc next pointer (such as 226). The disc next pointer (such as 226) communicates the next sector instruction (such as 212) to the disc address pointer (such as 224). In essence, the next sector instruction (such as 212) controls positioning of the disc address pointer (such as 224) within the particular buffer segment (such as 210). In case either the data was transferred (such as in operation 408) or removed and replaced (such as in operation 412) prematurely, either operation may be re-initiated (such as in operations 414, 416) according to the method (such as in operation 400).

It will be clear that the present invention is well adapted to attain the ends and advantages mentioned, as well as those inherent therein. While a presently preferred embodiment has been described for purposes of this disclosure, various changes and modifications may be made which are well within the scope of the present invention. For example, VBM may be useful to other types of data storage devices, such as tape drives, optical drives, and networks, that implement data transfer using a buffer. Similarly, the control module may be designed using integrated or logic circuits, as opposed to software, or in combination with software. Further, the application module may combine the address pointers and the next pointers into one single component. Additionally, the maintenance of the buffer table may be construed in various other ways that do not take away from the invention. For example, the techniques of VBM may be employed to a file allocation table. Also, the VBM table itself could be built as a doubly linked list (with both next and previous pointers), and hardware could be constructed to assist the software in the maintenance of such a table. The entire system could also be set up to work with collections of data larger or smaller than the standard 512 bytes. Numerous other changes may be made which will readily suggest themselves to those skilled in the art and which are encompassed in the spirit of the invention disclosed and as defined in the appended claims.

What is claimed is:

1. A buffer management system comprising:

a buffer; and a buffer table divided into a plurality of entries, wherein each entry represents a sector of the buffer operable to store a data block and combines with one or more entries to define a segment representing a block of sectors for temporarily storing a data file in the buffer, wherein each sector is accessed based on an access sequence collectively defined by next sector instructions singularly assigned to each entry in the segment.

2. The system of claim 1, wherein the segment is a circularly linked list of entries such that a next sector instruction of an entry representing a last sector of the block of sectors provides instructions to access an initial sector previously accessed during the transfer of the data file.

3. A method comprising steps of:

(a) creating a buffer table divided into a plurality of entries, wherein each entry represents a buffer sector operable to store one data block;

(b) combining one or more entries into a segment representing a block of buffer sectors for storing a data file in a buffer; and (c) assigning each entry of the segment a next sector instruction, wherein the next sector instructions assigned to the entries of the segment collectively define an access sequence in which the buffer sectors of the block of buffer sectors are to be accessed for storage of data blocks to and retrieval of data blocks from the block of buffer sectors.

4. The method of claim 3 wherein the data file is transferred from a data storage device to the buffer, the method further comprising steps of:

(e) storing the data file in the block of buffer sectors for a temporary period of time;

(f) removing the data file from the buffer one data block at a time as directed by the access sequence; and (g) transferring the data file to a host computer.

5. The method of claim 4, wherein the creating step (a) comprises a step of:

(a)(i) creating a free list of entries representing buffer sectors readily available for storage of subsequent data blocks transferred to the buffer.

6. The method of claim 5, wherein to removing step (f) comprises steps of:

(f)(i) removing a first data block of the data file from a first buffer sector;

(f)(ii) walking to a subsequent buffer sector as directed by the next sector instruction assigned to an entry representing the first buffer sector;

(f)(iii) removing a subsequent data block of the data file from the subsequent buffer sector; and (f)(iv) repeating the walking (f)(ii) and the removing (f)(iii) steps until the next sector instruction assigned to an entry representing the subsequent buffer sector references the entry representing the first buffer sector.

7. The method of claim 6, wherein the creating step (a) further comprises a step of:

(a)(ii) mending an entry representing each buffer sector from which a data block is removed into the free list of entries such that the buffer sectors from which the data blocks are removed become immediately available for storage.

8. The method of claim 7, wherein the storing step (e) comprises a step of:

comparing each data block of the data file to be stored in the block of buffer sectors to each data block currently stored in the block of buffer sectors to determine if a redundancy exists between the data blocks to be stored in the block of the buffer sectors and the data blocks currently stored in the block of buffer sectors.

9. The method of claim 8, wherein the comparing step comprises a step of:

mending an entry representing each buffer sector where a redundancy exists into the free list of entries such that the buffer sectors where a redundancy exists become immediately available for storage.

10. The method of claim 3, further comprising a step (d) of transferring the data file between the buffer and a data storage device by walking through the block of buffer sectors as directed by the access sequence, wherein the transferring step (d) arbitrarily selects a beginning buffer sector of the block of buffer sectors to which a first data block of the data file is to be transferred.

11. The method of claim 10, wherein the transferring step (d)

moves the data file from the buffer to the data storage device.

12. The method of claim 10, wherein the transferring step (d) comprises a step of:

walking through the block of buffer sectors with an address pointer coupled to a next pointer, wherein the next pointer communicates the next sector instructions to the address pointer such that the address pointer is walked through the block of buffer sectors as directed by the access sequence.

13. The method of claim 3, wherein the access sequence defines a circularly linked list of entries.

* * * * *